(12) United States Patent
Senoo et al.

(10) Patent No.: US 11,608,753 B2
(45) Date of Patent: Mar. 21, 2023

(54) TURBINE

(71) Applicant: MITSUBISHI HEAVY INDUSTRIES, LTD., Tokyo (JP)

(72) Inventors: Shigeki Senoo, Tokyo (JP); Yoshihiro Kuwamura, Tokyo (JP); Toshio Watanabe, Tokyo (JP); Sotaro Takei, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 33 days.

(21) Appl. No.: 17/358,369

(22) Filed: Jun. 25, 2021

(65) Prior Publication Data

US 2022/0003129 A1 Jan. 6, 2022

(30) Foreign Application Priority Data

Jul. 3, 2020 (JP) .............................. JP2020-115800

(51) Int. Cl.
*F01D 5/06* (2006.01)
*F01D 25/06* (2006.01)

(52) U.S. Cl.
CPC ........ *F01D 25/06* (2013.01); *F05D 2220/323* (2013.01); *F05D 2260/96* (2013.01)

(58) Field of Classification Search
CPC . F01D 25/06; F01D 25/04; F01D 9/00; F01D 9/04; F01D 9/041; F01D 5/00; F01D 5/02; F01D 5/025; F01D 5/027; F01D 5/06; F01D 5/10; F01D 5/148; F01D 5/16; F01D 5/22; F01D 5/26; F01D 5/30; F05D 2220/323; F05D 2260/96
See application file for complete search history.

(56) References Cited

U.S. PATENT DOCUMENTS

| | | | | |
|---|---|---|---|---|
| 2,922,618 | A | * | 1/1960 | Paulson ................ F01D 5/3076 416/204 R |
| 3,610,772 | A | * | 10/1971 | Wagle ...................... F01D 5/30 416/198 A |
| 4,097,192 | A | * | 6/1978 | Kulina ...................... F01D 5/16 416/175 |

(Continued)

FOREIGN PATENT DOCUMENTS

JP           2018-150857         9/2018

*Primary Examiner* — Woody A Lee, Jr.
*Assistant Examiner* — Joshua R Beebe
(74) *Attorney, Agent, or Firm* — Wenderoth, Lind & Ponack, L.L.P.

(57) ABSTRACT

A turbine includes a shaft configured to rotate about a rotor axis; a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk; and a pair of stator vane rows disposed in a one-to-one manner on a first side of the pair of rotating blade rows in the direction of the rotor axis, each one of the pair of stator vane rows including a plurality of stator vanes arranged in the circumferential direction, wherein a number of the rotating blades on each one of the pair of rotating blade rows is the same, and a number of the stator vanes on each one of the pair of stator vane rows is the same.

12 Claims, 10 Drawing Sheets

(56) References Cited

U.S. PATENT DOCUMENTS

| | | | | |
|---|---|---|---|---|
| 6,354,780 B1 * | 3/2002 | Davis | ............... | F01D 5/34 |
| | | | | 416/190 |
| RE39,630 E * | 5/2007 | Stangeland | ............... | F01D 5/26 |
| | | | | 416/193 A |
| 7,806,651 B2 * | 10/2010 | Kennepohl | ............... | F01D 5/10 |
| | | | | 415/199.5 |
| 7,918,644 B2 * | 4/2011 | Schreiber | ............... | F01D 5/30 |
| | | | | 415/199.5 |
| 9,683,447 B2 * | 6/2017 | Gentile | ............... | F01D 5/26 |
| 9,932,840 B2 * | 4/2018 | Fulayter | ............... | F01D 5/146 |
| 2010/0080705 A1 * | 4/2010 | Pronovost | ............... | F01D 5/02 |
| | | | | 29/889 |
| 2010/0111684 A1 * | 5/2010 | Ning | ............... | F01D 5/142 |
| | | | | 415/209.1 |
| 2011/0189003 A1 * | 8/2011 | Iida | ............... | F01D 5/142 |
| | | | | 415/199.2 |
| 2014/0190011 A1 * | 7/2014 | Tanaka | ............... | F01D 9/04 |
| | | | | 703/2 |
| 2016/0194961 A1 * | 7/2016 | Fulayter | ............... | F04D 29/321 |
| | | | | 310/326 |

\* cited by examiner

TURBINE

CROSS-REFERENCE TO RELATED APPLICATIONS

This application claims the benefit of priority to Japanese Patent Application Number 2020-115800 filed on Jul. 3, 2020. The entire contents of the above-identified application are hereby incorporated by reference.

TECHNICAL FIELD

The present disclosure relates to a turbine.

RELATED ART

A turbine for a turbopump provided in a jet engine of an aircraft, a turboprop engine of a helicopter, or an engine system of a space rocket has a wide range of operating rotational speeds. In addition, there is a demand for the turbine to be lightweight. A method used to reduce weight includes employing a blisk structure with rotating blades and a disk formed integrally and without shrouds provided on the rotating blade tips to decrease the distance in the axial direction between blade rows. However, by reducing the weight in this manner, structural damping functions of a turbine for power generation, including vibration suppression of the rotating blade tips due to friction between the shrouds of adjacent blades and suppression of the transfer of vibration between members (between rotating blades and the disk) due to friction between the rotating blades and the disk provided with the blades, are foregone. In addition, when the axial distance between the blade rows decreases, the excitation force of the rotational speed×the number of blades from the other blade rows tends to increase. In other words, due to the reduction in weight of the turbine, the resonant stress when resonance occurs due to the excitation force caused by adjacent blade rows increases, which makes damage to the blades more likely. In addition, the disk supporting the rotating blades is made thin, and the vibration of the blades is more likely to couple with the vibration of the disk to form a complex vibration mode. Furthermore, blade-disk coupling flutter is more likely to occur. Thus, it is desirable that lightweight turbines have a completely detuned design in which the excitation frequency and the natural frequency of the blade are separate.

The technique described in JP 2018-150857 is directed at avoiding such resonance and flutter issues. In JP 2018-150857, a technique is described in which two types of blades with tip portions of different weights are alternately arranged in the circumferential direction so that the natural frequency of adjacent blades is changed and resonance is avoided.

SUMMARY

However, the technique described in JP 2018-150857 is directed at a turbine for power generation in which the region of the operational rotational speeds is relatively narrow, and the completely detuned design cannot be achieved with a turbopump having a wide range of operational rotational speeds.

The present disclosure has been made in order to solve the problems described above, and an object of the present disclosure is to provide a turbine capable of avoiding resonance and flutter in a wide range of operational rotational speeds.

To solve the problem described above, a turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk; and a pair of stator vane rows disposed in a one-to-one manner on a first side of the pair of rotating blade rows in the direction of the rotor axis, each one of the pair of stator vane rows including a plurality of stator vanes arranged in the circumferential direction, wherein a number of the rotating blades on each one of the pair of rotating blade rows is the same, and a number of the stator vanes on each one of the pair of stator vane rows is the same.

A turbine according to the present disclosure includes a shaft configured to rotate about a rotor axis; a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk; a pair of stator vane rows disposed in a one-to-one manner on a first side of the pair of rotating blade rows in the direction of the rotor axis, each one of the pair of stator vane rows including a plurality of stator vanes arranged in the circumferential direction; and an attachment that connects radially inner end portions of the pair of disks and extends toward an outer peripheral surface of the shaft.

A turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk;

a pair of stator vane rows disposed in a one-to-one manner on a first side of the pair of rotating blade rows in the direction of the rotor axis, each one of the pair of stator vane rows including a plurality of stator vanes arranged in the circumferential direction; and a plurality of concave portions arranged at intervals in the circumferential direction, formed in a surface the disk facing the direction of the rotor axis.

A turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk;

a pair of stator vane rows disposed in a one-to-one manner on a first side of the pair of rotating blade rows in the direction of the rotor axis, each one of the pair of stator vane rows including a plurality of stator vanes arranged in the circumferential direction; and a plurality of through-holes arranged at intervals in the circumferential direction, formed in a surface the disk facing the direction of the rotor axis.

A turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk;

a pair of stator vane rows disposed in a one-to-one manner on a first side of the pair of rotating blade rows in the direction of the rotor axis, each one of the pair of stator vane rows including a plurality of stator vanes arranged in the circumferential direction; and a plurality of convex portions arranged at intervals in the circumferential direction, formed in a surface the disk facing the direction of the rotor axis.

A turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk; and a pair of stator vane rows disposed in a one-to-one manner on a first side of the pair of rotating blade rows in the direction of the rotor axis, each one of the pair of stator vane rows including a plurality of stator vanes arranged in the circumferential direction, wherein a rotating blade of the plurality of rotating blades continuous in the circumferential direction is provided with a concave portion of the rotating blade, the concave portion being recessed radially inward from a radially outer end surface.

A turbine according to the present disclosure includes:

a shaft configured to rotate about a rotor axis;

a pair of rotating blade rows, the pair of rotating blade rows including a pair of disks that extend radially outward from the shaft and are disposed at an interval in a direction of the rotor axis, each one of the pair of rotating blade rows including a plurality of rotating blades arranged in a circumferential direction on an outer peripheral end of the disk;

a pair of stator vane rows disposed in a one-to-one manner on a first side of the pair of rotating blade rows in the direction of the rotor axis, each one of the pair of stator vane rows including a plurality of stator vanes arranged in the circumferential direction;

an annular portion provided on the disk, the annular portion having an annular shape centered on the rotor axis;

a plurality of linear portions extending in the direction of the rotor axis arranged at intervals in the circumferential direction along the annular portion; and a damper portion formed of a different material than the disk.

According to the present disclosure, a turbine can be provided that further reduces resonance and flutter.

BRIEF DESCRIPTION OF DRAWINGS

The disclosure will be described with reference to the accompanying drawings, wherein like numbers reference like elements.

DESCRIPTION OF EMBODIMENTS

First Embodiment

Configuration of Rocket Engine

Figure 1:
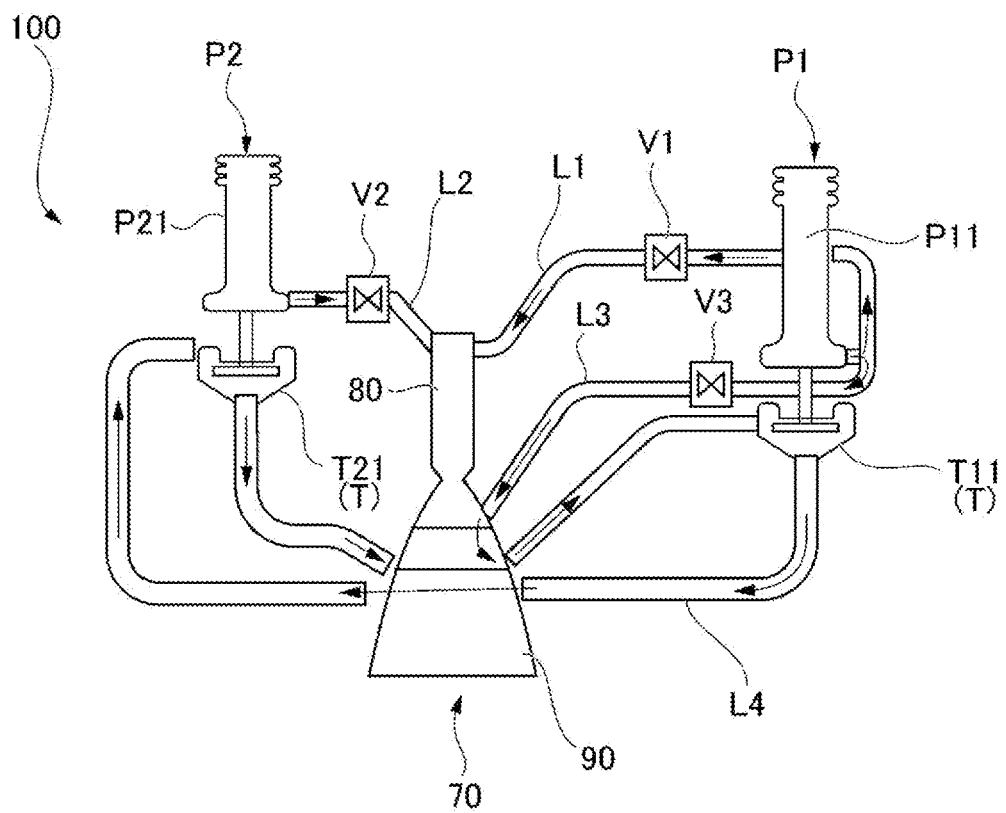
FIG. 1 is a schematic view illustrating a configuration of a rocket engine according to a first embodiment of the present disclosure.

Hereinafter, a rocket engine 100, which is an application example of a turbine T according to a first embodiment of the present disclosure, will be described with reference to FIGS. 1 to 4. As illustrated in FIG. 1, the rocket engine 100 includes a liquid hydrogen turbopump P1, a liquid oxygen turbopump P2, an engine main body 70, a fuel line L1, an oxidizer line L2, a coolant line L3, a recovery line L4, a fuel valve V1, an oxidizer valve V2, and a coolant valve V3.

The liquid hydrogen turbopump P1 is a device for pumping liquid hydrogen as a fuel to the engine main body 70. The liquid hydrogen turbopump P1 includes a pump main body P11 and a turbine T11. The rotational force generated by the turbine T11 rotationally drives the pump main body P11. The pump main body P11 is connected to the engine main body 70 by the fuel line L1. The fuel valve V1 that changes the supply amount of liquid hydrogen is provided on the fuel line L1.

The pump main body P11 is also connected to the engine main body 70 by the cooling line L3 that branches partway from the fuel line L1. That is, the liquid hydrogen that has been pumped into the pump main body P11 is used not only as fuel, but also as a coolant for the engine main body 70. Note that the engine main body 70 includes a combustion chamber 80 and a nozzle 90. The liquid hydrogen, as fuel, is supplied to the combustion chamber 80 by the fuel line L1, and the liquid hydrogen, as coolant, is supplied to the nozzle 90 by the coolant line L3. The coolant valve V3 that changes the supply amount of liquid hydrogen is provided on the coolant line L3.

The liquid hydrogen, i.e., coolant, that has cooled the nozzle 90 via the coolant line L3 is returned to the turbine T11 to provide rotational energy to the turbine T11. This drives the pump main body P11. The liquid hydrogen used to drive the pump main body P11 is supplied to a turbine T21 of the liquid oxygen turbopump P2, which will be described later, via the recovery line L4 connected to the turbine T11.

The liquid hydrogen used to drive the turbine T21 is discharged to the exterior of the engine main body 70 via the nozzle 90.

The liquid oxygen turbopump P2 is a device for pumping liquid oxygen as an oxidizer to the engine main body 70 (the combustion chamber 80). The liquid oxygen turbopump P2 includes a pump main body P21 and the turbine T21. The rotational force generated by the turbine T21 rotationally drives the pump main body P21. The pump main body P21 is connected to the combustion chamber 80 of the engine main body 70 by the oxidizer line L2. The oxidizer valve V2 that changes the supply amount of oxidizer is provided on the oxidizer line L2.

Configuration of Turbine

Next, the configuration of the turbine T11 and the turbine T21 described above will be described with reference to FIGS. 2 to 4. Note that in the following description, the turbine T11 and the turbine T21 are collectively referred to as the turbine T.

Figure 2:
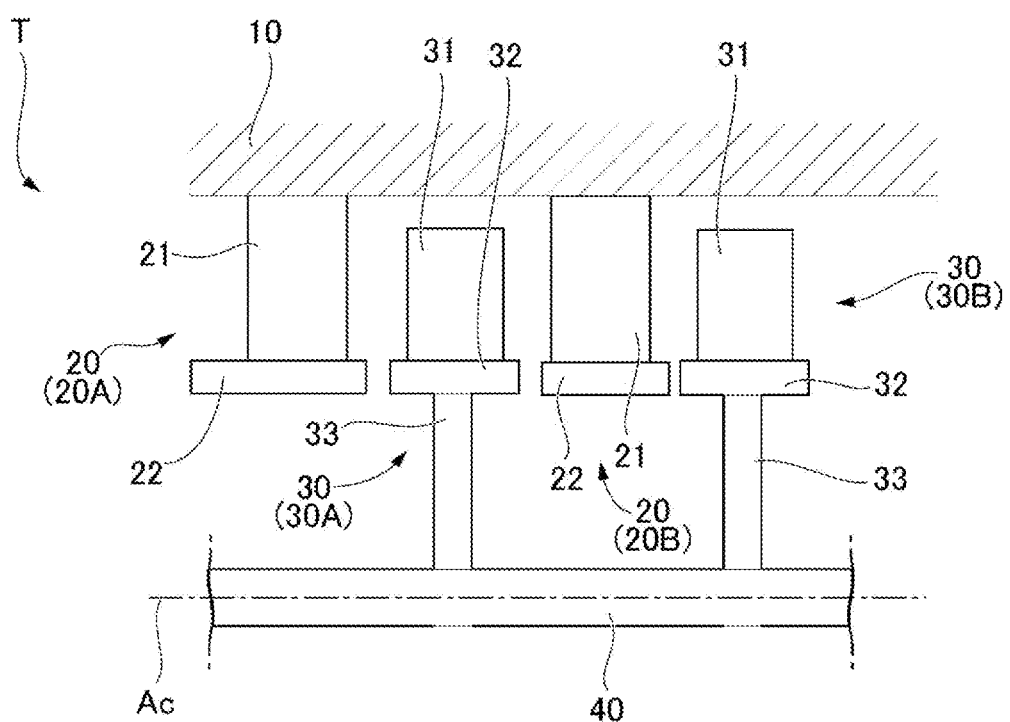
FIG. 2 is a cross-sectional view illustrating a configuration of a turbine according to the first embodiment of the present disclosure.

As illustrated in FIG. 2, the turbine T includes a shaft 40 extending along a rotor axis Ac, a pair of rotating blade rows 30 provided on the shaft 40 at intervals in the rotor axis Ac, a cylindrical casing 10 that covers the shaft 40 and the rotating blade rows 30 from the outer side in the radial direction, and a pair of stator vane rows 20 provided on the inner peripheral surface of the casing 10, each of the pair of stator vane rows 20 being provided upstream (a first side in the rotor axis Ac, i.e., the side from which the fluid flows) of one of the pair of rotating blade rows 30.

The shaft 40 is rotatable about the rotor axis Ac. The rotating blade rows 30 are integrally formed with the shaft 40. In other words, the shaft 40 and the rotating blade rows 30 form a rotor called a blisk. Each of the rotating blade rows 30 includes a disk-shaped disk 33 projecting radially outward from the outer peripheral surface of the shaft 40, a platform 32 attached to the outer peripheral surface of the disk 33, and a plurality of rotating blades 31 extending radially outward from the platform 32. The plurality of rotating blades 31 are arranged at intervals in the circumferential direction. Each rotating blade 31 has a blade-shaped cross section when viewed from the radial direction. In addition, the dimension (thickness) of the disk 33 in the rotor axis Ac direction is smaller than the dimension of the rotating blades 31 and the platform 32. Note that, in the following description, of the pair of rotating blade rows 30, the rotating blade row 30 located upstream may be referred to as a first rotating blade row 30A, and the rotating blade row 30 located downstream may be referred to as a second rotating blade row 30B.

Each of the stator vane rows 20 includes a plurality of stator vanes 21 protruding radially inward from the inner peripheral surface of the casing 10, and a shroud 22 provided on an inner peripheral end portion of each stator vane 21. Each stator vane 21 has a blade-shaped cross section when viewed from the radial direction. The shroud 22 is a plate-like member attached to the inner peripheral end portion of the stator vane 21. The plurality of shrouds 22 provided continuously in the circumferential direction form an annular shape with the rotor axis Ac as the center. Note that, in the following description, the stator vane row 20 located upstream of the first rotating blade row 30A may be referred to as a first stator vane row 20A, and the stator vane row 20 located upstream of the second rotating blade row 30B may be referred to as a second stator vane row 20B.

In the turbine T configured as described above, the number of rotating blades 31 and the number of stator vanes 21 satisfy the following conditions. That is, the number of rotating blades 31 is the same for each of the pair of rotating blade rows 30, and the number of stator vanes 21 is the same for each of the pair of stator vane rows 20.

Figure 3:
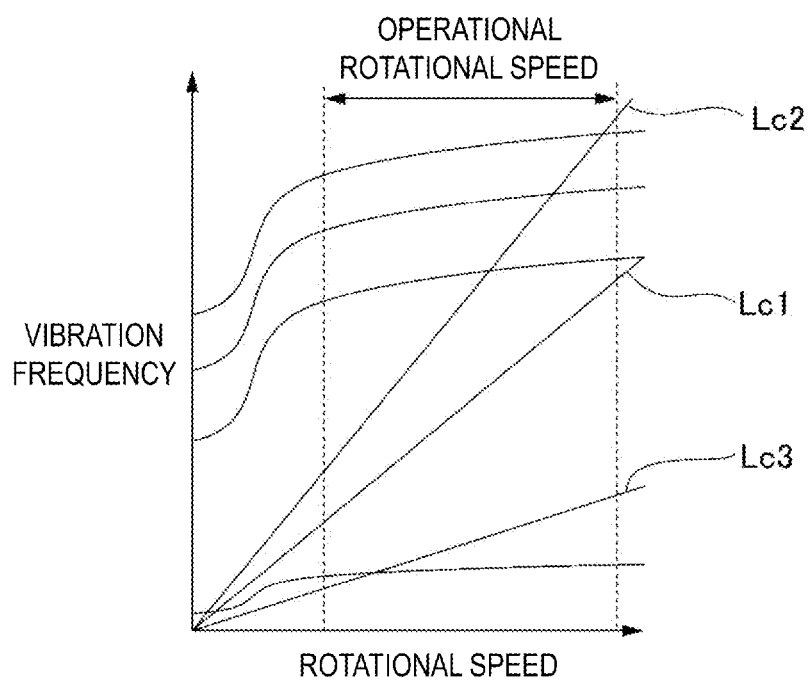
FIG. 3 is a Campbell diagram showing the relationship between the rotational speed of the rotating blades and the vibration frequency.
Figure 4:
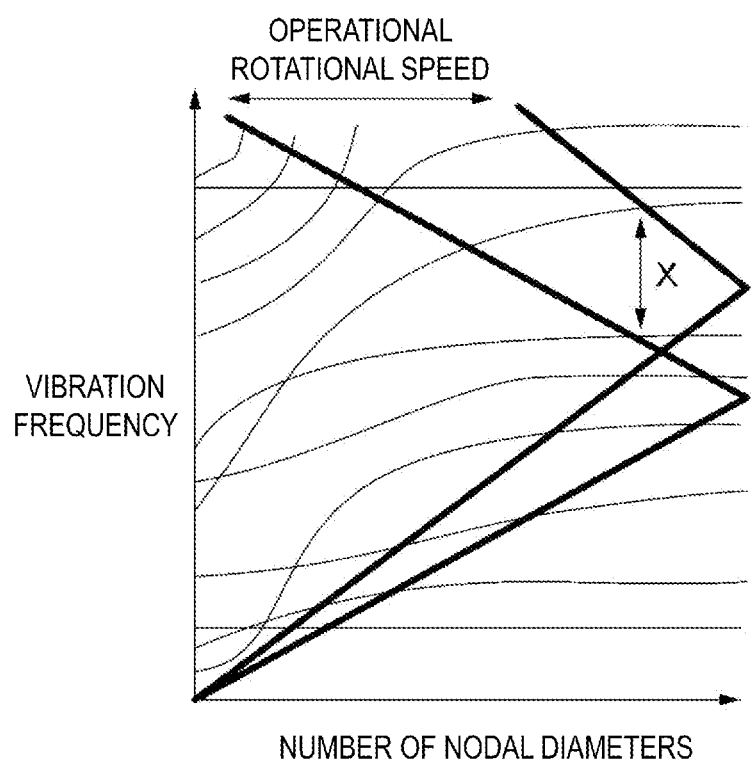
FIG. 4 is an interference diagram showing the relationship between the number of nodal diameters of the stator vanes and the vibration frequency.

Reference is now made to the Campbell diagram of FIG. 3. In this diagram, the curve indicates the natural frequency of the rotating blades 31. The straight line Lc1 is an excitation line formed by the number of stator vanes×the rotational speed, in a case where the number of stator vanes 21 is the same for each of the pair of stator vane rows 20 as in the present embodiment. As illustrated in the diagram, the excitation line (the straight line Lc1) in this case does not intersect a line indicating the natural frequency of the rotating blades 31. In other words, this indicates that resonance does not occur in the region of the operational rotational speed. On the other hand, in a case where the number of blades does not satisfy the conditions described above, three excitation lines indicated by an excitation line (a straight line Lc2) formed by the number of stator vanes 1×the rotational speed, the excitation line (the straight line Lc1) formed by the number of stator vanes 2×the rotational speed, and an excitation line (a straight line Lc3) formed by (the difference between the number of stator vanes 1 and the number of stator vanes 2)×the rotational speed are produced and intersect the line indicating the natural frequency at at least one point within the broad operational rotational speed range. That is, a resonance occurs at a specific rotational speed. By replacing the relationship in question between the stator vane and rotating blade and matching the number of rotating blades 31 in each of adjacent rotating blade rows 30, it is possible to reduce the excitation lines with respect to the stator vane from three to one. It is possible to avoid resonance of the stator vane due to the excitation force of the number of rotating blades×the rotational speed.

Furthermore, in the present embodiment, in addition to the conditions described above, the number of the stator vanes 21 is set to be from 30% to 70% of the number of rotating blades 31. For example, in a case where the number of rotating blades 31 is 80, the number of stator vanes 21 ranges from 24 to 56. Reference is now made to the interference diagram of FIG. 4. This graph shows the relationship between the number of nodal diameters and the vibration frequency. The number of nodal diameters is the number of waves in the circumferential direction of the rotating blade vibration, and the maximum value is an integer value equal to half of the number of rotating blades. In addition to matching the natural frequency of the blades and the frequency of the excitation force, the resonance condition by the stator vanes of the rotating blade vibration mode periodic in the circumferential direction needs to satisfy the condition: the number of stator vanes=N×the number of rotating blades±the number of nodal diameters of the rotating blade vibration (N=0, 1, 2, . . . ). The curves represented by the thin solid lines in the graph indicate the natural frequency of the blades. The range of the operational rotational speed is the region enclosed by the thick solid line. By identifying a portion where the lines representing the natural frequency of the blades are sparse within the range of the operational rotational speed, the number X of the stator vanes 21 in which resonance does not occur can be calculated. There are many complex modes in which the blades and the disk are coupled in the left region of the graph where the number of nodal diameters is low, and resonance prevention is difficult because the natural frequency varies depending on the number of nodal diameters. On the other hand, in the region occupying approximately 30% from the right end of the graph where the number of nodal diameters is high, the blade vibration does not couple with the disk.

Thus, the natural frequency of the blades does not vary depending on the number of nodal diameters, and a region where the natural frequency of the rotating blades is not present in the operational range can be found. In other words, the above-described conditions (the number of stator vanes 21 ranging from 30% to 70% of the rotating blades 31) can be calculated. In this manner, a design technique (referred to as a "completely detuned design") is implemented that finds a region where an excitation line does not intersect with the natural frequency of the blades within the range of operational rotational speeds on the basis of a Campbell diagram and/or an interference diagram.

Operational Effects

Here, the turbine T provided in the rocket engine 100 has a wide range of operational rotational speeds. In addition, there is a demand for the turbine to be lightweight. More specifically, because weight reduction is achieved by not providing shrouds on the rotating blade tips and the distance between the blade rows is reduced, the excitation force of the rotational speed×the number of blades tends to increase. In addition, by integrally forming the blades and the disk to reduce weight, a structure is used that is referred to as a blisk that eliminates the portions where the blades are attached to the disk used in a typical turbine. A blisk structure does not have a structural damping mechanism for damping blade vibration via friction from the small movement of the blade attachment portion. In other words, because the excitation force from the number of adjacent blade rows is great and the structural damping is low, in a case where resonance occurs, the resonant stress is great and the blades are easily damaged. Accordingly, a completely detuned design is demanded in which the blade natural frequency and the excitation line do not intersect in the range of the operational rotational speeds. In addition, the disk supporting the blades is made thin, and the vibration of the blades is more likely to couple with the vibration of the disk to form a complex vibration mode. Furthermore, blade-disk coupling flutter is more likely to occur.

However, according to the above-described configuration, the number of rotating blades 31 is the same for each of the pair of rotating blade rows 30, and the number of stator vanes 21 is the same for each of the pair of stator vane rows 20. In this case, referring to the Campbell diagram, with the rotational speed on the horizontal axis and the vibration frequency on the vertical axis, the excitation lines of the rotating blades 31 or the stator vanes 21 do not intersect the line indicating the natural frequency of the blades in the range of the operational rotational speeds. Thus, resonance of the rotating blades 31 and the stator vanes 21 can be avoided.

Furthermore, according to the configuration described above, the number of the stator vanes 21 ranges from 30% to 70% of the number of rotating blades 31. Referring to the interference diagram, with the number of nodal diameters on the horizontal axis and the vibration frequency on the vertical axis, there is a region in the range of operating rotational speeds of the turbine T where the lines indicating the natural frequencies of the blades do not intersect. In this region, the number of the stator vanes 21 ranges from 30% to 70% of the number of the rotating blades 31. Thus, according to this configuration, resonance of the rotating blades 31 and the stator vanes 21 can be more actively avoided.

Second Embodiment

Figure 5:
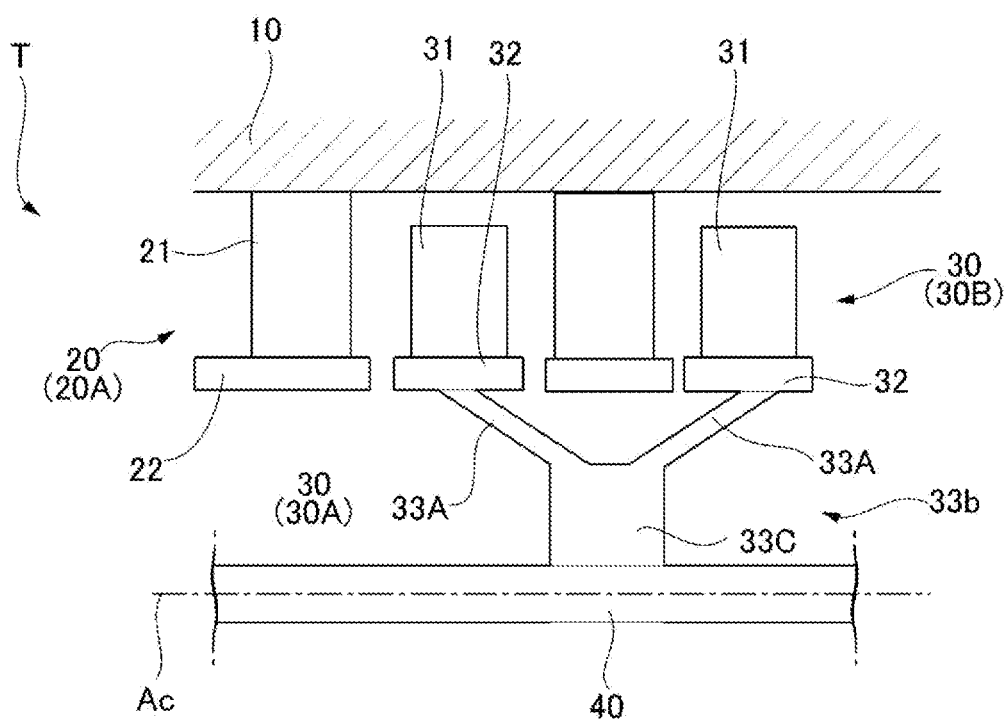
FIG. 5 is a cross-sectional view illustrating a configuration of a turbine according to a second embodiment of the present disclosure.

Next, a second embodiment of the present disclosure will be described with reference to FIG. 5. Note that the same components as those of the first embodiment will be denoted by the same reference signs, and a detailed description thereof will be omitted. As illustrated in the same diagram, the present embodiment is different from the first embodiment in terms of having a configuration in which a disk coupling body 33b supports each of the rotating blade rows 30. Specifically, the disk coupling body 33b includes a pair of disks 33A extending from the rotating blade rows 30 in directions towards one another and an attachment 33C that connects the disks 33A to one another on the inner side in the radial direction. The pair of disks 33A have a cross-sectional shape extending in a direction separating from one another in the rotor axis Ac direction as they extend from radially inward to outward, as seen in a cross-sectional view including the rotor axis Ac. The radially inner end surface of the attachment 33C is connected to the outer peripheral surface of the shaft 40.

According to the configuration described above, the pair of disks 33A are connected, and the attachment 33C that extends toward the outer peripheral surface of the shaft 40 is formed. In other words, the pair of disks 33A are grouped together via the single attachment 33C. This also results in the disk coupling body 33b forming only a single excitation line. As a result, in the interference diagram described in reference to the first embodiment, a region where a line indicating the natural frequency of each of the blades and an excitation line of the disk coupling body 33b do not intersect with one another can be more easily identified. In other words, it is possible to increase the design freedom of the blades.

Third Embodiment

Figure 6:
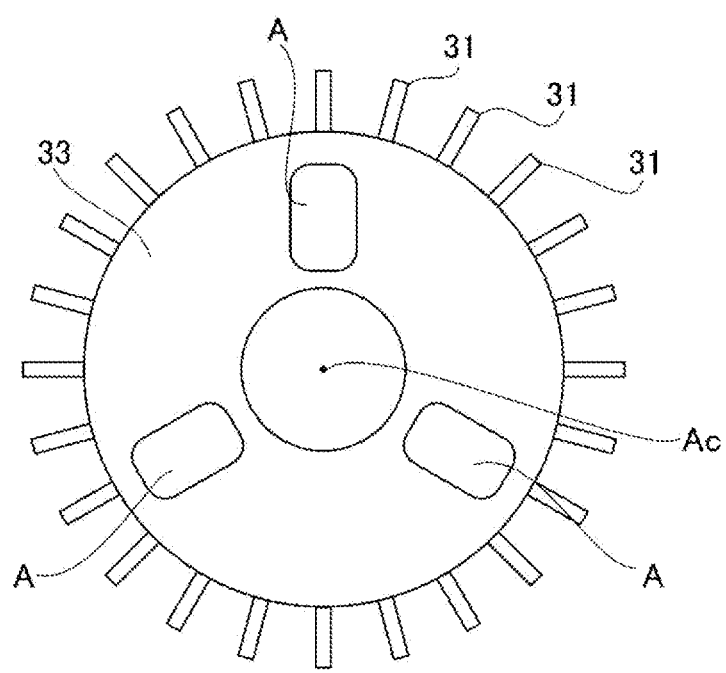
FIG. 6 is a plan view illustrating a configuration of a disk and rotating blades according to a third embodiment of the present disclosure.

Next, a third embodiment of the present disclosure will be described with reference to FIG. 6. The same components as those in each of the above-described embodiments will be denoted by the same reference signs, and a detailed description thereof will be omitted. As illustrated in the same diagram, in the present embodiment, a plurality of mistune portions A are formed on the surface of the disk 33 facing the rotor axis Ac direction. These mistune portions A are arranged at equal or unequal intervals in the circumferential direction. Specifically, suitable examples of the mistune portion A include a concave portion recessed from the surface of the disk 33, a through-hole penetrating through the disk 33 in the direction of the rotor axis Ac, or a convex portion projecting from the surface. In a case where a non-uniform structure, such as a concave portion, a through-hole, a convex portion, or the like, are provided at equal intervals in the circumferential direction, the number of non-uniform structures and the number of rotating blades are coprime. In a case where the number of rotating blades and the number of non-uniform structures of the disk are coprime, the number of nodal diameters of the rotating blade vibration and the number of nodal diameters of the disk vibration are non-equal. Thus, the rotating blade vibration (twist) and the disk vibration (bend) do not couple, and flutter is avoided.

In addition, according to the configuration with non-equal intervals in the circumferential direction, the plurality of mistune portions A are formed on the disk 33. Accordingly, flutter can be avoided because coupling between the vibrations of the blades and the vibration of the disk 33 is less likely to occur. As a result, the turbine T can be operated more stably. Compared to a technique that prevents flutter by mistuning a known blade shape, a technique for adding a structure to the disk 33 side to prevent blade-disk coupling flutter does not change the blade shape, which plays a large role in the fluid performance of the turbine T. Thus, flutter can be suppressed while maintaining fluid performance. Furthermore, the concave portions and the through-holes in the disk 33 have the effect of reducing the weight of the turbine T, and the convex portions can have a rib effect of increasing the disk rigidity. This increase in rigidity allows the disk 33 to be made thinner, thus achieving a weight reduction effect. Note that it is desirable that the concave portions, through-hole portions, and convex portions have a shape that smoothly changes in the circumferential direction in order to minimize windage loss due to rotation of the disk 33.

Fourth Embodiment

Figure 7:
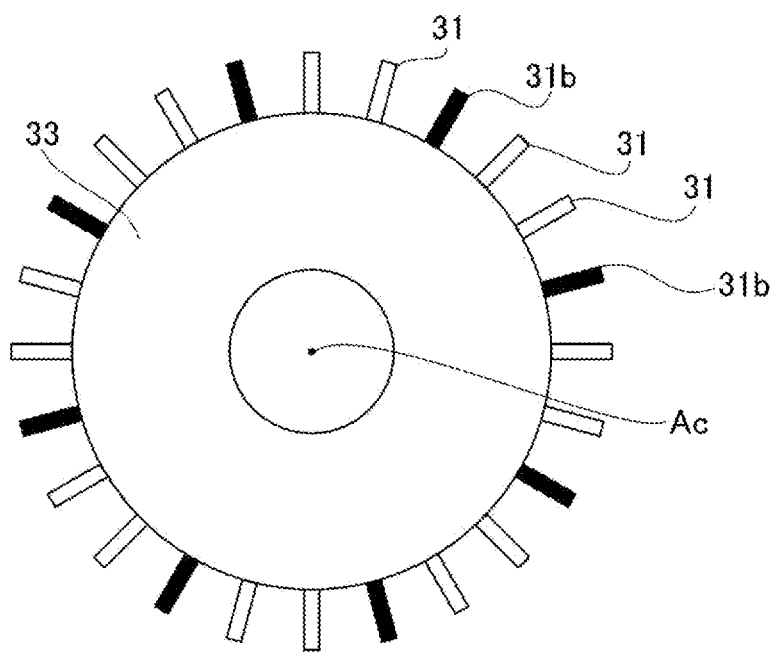
FIG. 7 is a plan view illustrating a configuration of a disk and rotating blades according to a fourth embodiment of the present disclosure.
Figure 8:
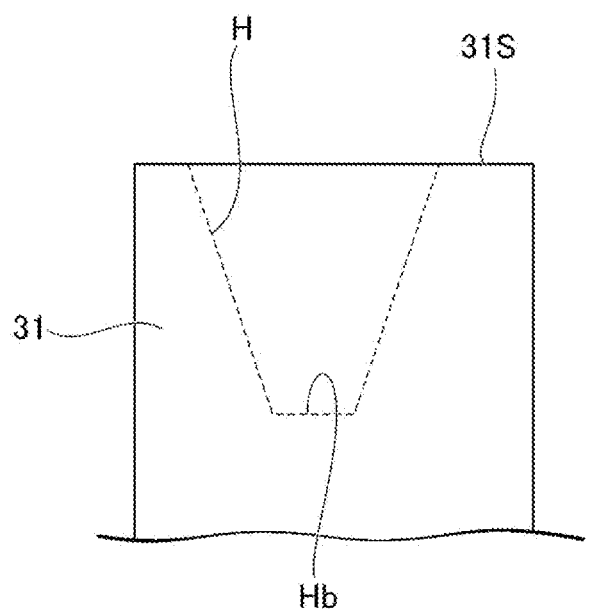
FIG. 8 is a cross-sectional view illustrating a configuration of a tip portion of the rotating blade according to the fourth embodiment of the present disclosure.

Next, a fourth embodiment of the present disclosure will be described with reference to FIGS. 7 and 8. The same components as those in each of the above-described embodiments will be denoted by the same reference signs, and a detailed description thereof will be omitted. As illustrated in FIG. 7, in the present embodiment, rotating blades 31$b$ that are different from the rotating blades 31 are provided at intervals of two or more in the circumferential direction. Specifically, a concave portion H of the rotating blade is formed in one rotating blade 31$b$ of the plurality of rotating blades 31 continuous in the circumferential direction, the concave portion H being recessed radially inward from the radially outer end surface. The concave portion H of the rotating blade is a hole recessed radially inward from the radially outer end surface (outer end surface 31S) of the rotating blade 31. A bottom surface Hb of the concave portion H of the rotating blade is located partway along the radial direction of the rotating blade 31. Additionally, the cross-sectional shape of the concave portion H of the rotating blade may be circular or rectangular, and the opening area gradually decreases toward the inner side in the radial direction. Furthermore, it is also possible to adopt a configuration in which three or more types of rotating blades 31 having different opening shapes, opening areas, and opening depths are randomly arranged.

According to the above-described configuration, by selecting the cross-sectional shape and the size of the concave portion, it is possible to give the rotating blades 31 a plurality of different natural frequencies. In this manner, the natural frequency can be different between adjacent rotating blades 31. As a result, the possibility of flutter occurring in the rotating blades 31 can be reduced, and the weight of the rotating blades 31 can be reduced.

Furthermore, according to the above-described configuration, the opening area of the concave portion H of the rotating blade may gradually decrease toward the inner side in the radial direction. As a result, the thickness of the rotating blade 31 can be ensured on the inner side in the radial direction where strength is required, and further weight reduction of the rotating blade 31 can be achieved by increasing the opening area on the outer side in the radial direction where there is a low strength load.

Fifth Embodiment

Figure 9:
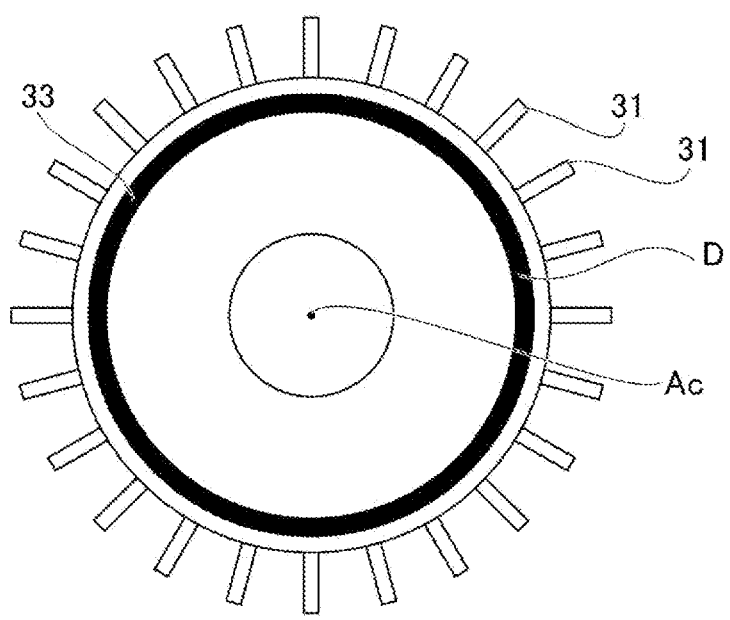
FIG. 9 is a plan view illustrating a configuration of a disk and rotating blades according to a fifth embodiment of the present disclosure.

Next, a fifth embodiment of the present disclosure will be described with reference to FIGS. 9 and 10. The same components as those in each of the above-described embodiments will be denoted by the same reference signs, and a detailed description thereof will be omitted. As illustrated in FIG. 9, in the present embodiment, a damper portion D is attached to the surface of the disk 33 facing the rotor axis Ac direction. The damper portion D is formed of a different material than the disk 33. The damper portion D has an annular shape centered on the rotor axis Ac.

Figure 10:
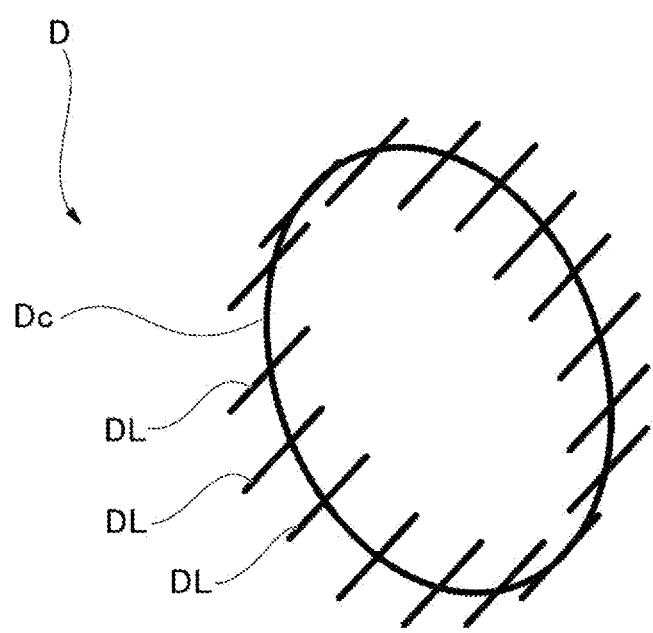
FIG. 10 is a perspective view illustrating a configuration of a damper portion according to a fifth embodiment of the present disclosure.

More specifically, as illustrated in FIG. 10, the damper portion D includes an annular portion Dc and a plurality of linear portions DL arranged at intervals in the circumferential direction along the annular portion Dc. The linear portions DL extend in the direction of the rotor axis Ac. Furthermore, the number of linear portions DL can be selected as desired as a number corresponding to the number of nodal diameters for which vibration control is performed.

According to the above-described configuration, when vibration occurs in the disk 33, the damper portion D including the annular portion Dc and the linear portions DL slides against the disk 33, thereby exerting a vibration damping force. This can effectively reduce the vibration of the disk 33 and the rotating blades 31.

Other Embodiments

Each of the embodiments of the present disclosure has been described above. Note that various changes and modifications can be made to the above-described configurations without departing from the gist of the present disclosure. For example, in the damper portion D described in the fifth embodiment, the annular portion Dc and the linear portions DL are formed of the same material. However, it is also possible to attach piezoelectric elements to the annular portion Dc instead of the linear portions DL. In this case as well, a plurality of piezoelectric elements are attached at intervals in the circumferential direction along the annular portion Dc.

In a case where the piezoelectric elements are operated as a passive type, an LC circuit can be added to the piezoelectric elements, and when deformation is caused by an external force, the hardness can be increased by the electromotive force of the LC circuit. By using the linear portions DL as piezoelectric elements and operating as a passive type, when vibration occurs, the hardness of the elements increases and vibration can be more effectively dampened. Note that the piezoelectric elements can be operated as an active type by the addition of a power supply circuit.

Notes

The turbine according to each of the embodiments is construed, for example, in the following manner.

(1) A turbine T of a first aspect includes:

a shaft 40 configured to rotate about a rotor axis Ac;

a pair of rotating blade rows 30, the pair of rotating blade rows 30 including a pair of disks 33 that extend radially outward from the shaft 40 and are disposed at an interval in a direction of the rotor axis, each one of the pair of rotating blade rows 30 including a plurality of rotating blades 31 arranged in a circumferential direction on an outer peripheral end of the disk 33; and a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction, wherein a number of the rotating blades 31 on each one of the pair of rotating blade rows 30 is the same, and a number of the stator vanes 21 on each one of the pair of stator vane rows 20 is the same.

According to the above-described configuration, the number of rotating blades 31 is the same for each of the pair of rotating blade rows 30, and the number of stator vanes 21 is the same for each of the pair of stator vane rows 20. In this case, referring to the Campbell diagram, with the rotational speed on the horizontal axis and the vibration frequency on the vertical axis, the excitation lines of the rotating blades 31 or the stator vanes 21 do not intersect the line indicating the natural frequency of the blades. Thus, resonance of the rotating blades 31 and the stator vanes 21 can be avoided in the range of operational rotational speeds.

(2) In the turbine T according to a second aspect, the number of the stator vanes 21 ranges from 30% to 70% of the number of the rotating blades 31.

According to the configuration described above, the number of the stator vanes 21 ranges from 30% to 70% of the number of the rotating blades 31. Referring to the interference diagram, with the number of nodal diameters on the horizontal axis and the vibration frequency on the vertical axis, there is a region in the range of operating rotational speeds of the turbine T where the lines indicating the natural frequencies of the blades do not intersect. In this region, the number of the stator vanes 21 ranges from 30% to 70% of the number of the rotating blades 31. Thus, according to this configuration, resonance of the rotating blades 31 and the stator vanes 21 can be more actively avoided.

(3) The turbine T according to a third aspect further includes an attachment 33C that connects radially inner end portions of the pair of disks 33 and extends toward an outer peripheral surface of the shaft 40.

According to the configuration described above, there is formed the attachment 33C that connects the pair of disks 33 and extends toward the outer peripheral surface of the shaft 40. In other words, one pair of disks 33 is grouped together by a single attachment 33C. In this manner, since the disk 33 has a single excitation line, a region where a line indicating the natural frequency of each of the blades and the excitation line of the disk 33 do not intersect with one another can be more easily identified. In other words, it is possible to increase the design freedom of the blades.

(4) The turbine T according to a fourth aspect further includes a plurality of concave portions arranged at intervals in the circumferential direction, formed in a surface of the disk 33 facing the direction of the rotor axis Ac.

According to the configuration described above, the plurality of concave portions are formed in the disk 33. Accordingly, flutter can be avoided because coupling between the vibrations of the blades and the vibration of the disk 33 is less likely to occur. Compared to a technique that prevents flutter by mistuning a known blade shape, a technique for adding a structure to the disk 33 side to prevent blade-disk coupling flutter does not change the blade shape, which plays a large role in the fluid performance of the turbine T. Thus flutter can be suppressed while maintaining fluid performance. Furthermore, the concave portions of the disk 33 have the effect of reducing the weight of the turbine T.

(5) The turbine T according to a fifth aspect further includes a plurality of through-holes arranged at intervals in the circumferential direction, formed in a surface of the disk 33 facing the direction of the rotor axis Ac.

According to the configuration described above, the plurality of through-holes are formed in the disk 33. Accordingly, flutter can be avoided because coupling between the vibrations of the blades and the vibration of the disk 33 is less likely to occur. Compared to a technique that prevents flutter by mistuning a known blade shape, a technique for adding a structure to the disk 33 side to prevent blade-disk coupling flutter does not change the blade shape, which plays a large role in the fluid performance of the turbine T. Thus, flutter can be suppressed while maintaining fluid performance. Furthermore, the through-holes of the disk 33 have the effect of reducing the weight of the turbine T.

(6) The turbine T according to a sixth aspect further includes a plurality of convex portions arranged at intervals in the circumferential direction, formed in a surface of the disk 33 facing the direction of the rotor axis Ac.

According to the configuration described above, the plurality of convex portions are formed in the disk 33. Accordingly, flutter can be avoided because coupling between the vibrations of the blades and the vibration of the disk 33 is less likely to occur. Compared to a technique that prevents flutter by mistuning a known blade shape, a technique for adding a structure to the disk 33 side to prevent blade-disk coupling flutter does not change the blade shape, which plays a large role in the fluid performance of the turbine T. Thus, flutter can be suppressed while maintaining fluid performance. Furthermore, the convex portions can have a rib effect of increasing the disk rigidity. This increase in rigidity allows the disk to be made thinner, thus achieving a weight reduction effect.

(7) In the turbine T according to a seventh aspect, a rotating blade 31 of the plurality of rotating blades 31 continuous in the circumferential direction is provided with a concave portion H of the rotating blade, the concave portion H being recessed radially inward from a radially outer end surface.

According to the above-described configuration, the concave portion H of the rotating blade is formed in one of the plurality of rotating blades 31 continuous in the circumferential direction. In this manner, by selecting the cross-sectional shape and the size of the concave portion, it is possible to give the rotating blades 31 a plurality of different natural frequencies. In this manner, the natural frequency can be different between adjacent rotating blades 31. As a result, the possibility of flutter occurring in the rotating blades 31 can be reduced, and the weight of the rotating blades 31 can be reduced.

(8) In the turbine according to an eighth aspect, the concave portion H of the rotating blade gradually decreases in opening area toward a radially inner side.

According to the above-described configuration, the opening area of the concave portion H of the rotating blade gradually decreases toward the inner side in the radial direction. As a result, the thickness of the rotating blade 31 can be ensured on the inner side in the radial direction where strength is required, and further weight reduction of the rotating blade 31 can be achieved by increasing the opening area on the outer side in the radial direction where there is a low strength load.

(9) The turbine T according to a ninth aspect includes an annular portion Dc provided on the disk 33, the annular portion Dc having an annular shape centered on the rotor axis Ac;

a plurality of linear portions DL extending in the direction of the rotor axis Ac arranged at intervals in the circumferential direction along the annular portion Dc; and a damper portion D formed of a different material than the disk 33.

According to the above-described configuration, when vibration occurs in the disk 33, the damper portion D including the annular portion Dc and the linear portions DL slide against the disk 33, thereby exerting a vibration damping force. This can effectively reduce the vibration of the disk 33 and the rotating blades 31.

(10) The turbine T according to a tenth aspect, wherein the plurality of linear portions DL are each formed by a piezoelectric element.

Adding an LC circuit gives the piezoelectric element a characteristic where, when deformation is caused by an external force, the electromotive force of the LC circuit causes hardness to increase. By configuring the linear portions DL as passive piezoelectric elements, when vibration occurs, the hardness of the elements increases and vibration can be more effectively dampened. A power supply circuit may be added instead of an LC circuit to form an active piezoelectric element.

(11) A turbine T according to an eleventh aspect includes:
a shaft 40 configured to rotate about a rotor axis Ac;
a pair of rotating blade rows 30, the pair of rotating blade rows 30 including a pair of disks 33 that extend radially outward from the shaft 40 and are disposed at an interval in a direction of the rotor axis Ac, each one of the pair of rotating blade rows 30 including a plurality of rotating blades 31 arranged in a circumferential direction on an outer peripheral end of the disk 33;
a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction; and
a plurality of concave portions arranged at intervals in the circumferential direction, formed in a surface the disk 33 facing the direction of the rotor axis Ac.

According to the configuration described above, the plurality of concave portions are formed in the disk 33. Accordingly, flutter can be avoided because coupling between the vibrations of the blades and the vibration of the disk 33 is less likely to occur.

(12) A turbine T according to a twelfth aspect includes:
a shaft 40 configured to rotate about a rotor axis Ac;
a pair of rotating blade rows 30, the pair of rotating blade rows 30 including a pair of disks 33 that extend radially outward from the shaft 40 and are disposed at an interval in a direction of the rotor axis Ac, each one of the pair of rotating blade rows 30 including a plurality of rotating blades 31 arranged in a circumferential direction on an outer peripheral end of the disk 33;
a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction; and
a plurality of through-holes arranged at intervals in the circumferential direction, formed in a surface the disk 33 facing the direction of the rotor axis Ac.

According to the configuration described above, the plurality of through-holes are formed in the disk 33. Accordingly, flutter can be avoided because coupling between the vibrations of the blades and the vibration of the disk 33 is less likely to occur.

(13) A turbine T according to a thirteenth aspect includes:
a shaft 40 configured to rotate about a rotor axis Ac;
a pair of rotating blade rows 30, the pair of rotating blade rows 30 including a pair of disks 33 that extend radially outward from the shaft 40 and are disposed at an interval in a direction of the rotor axis Ac, each one of the pair of rotating blade rows 30 including a plurality of rotating blades 31 arranged in a circumferential direction on an outer peripheral end of the disk 33;
a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction; and
a plurality of convex portions arranged at intervals in the circumferential direction, formed in a surface the disk 33 facing the direction of the rotor axis Ac.

According to the configuration described above, the plurality of convex portions are formed in the disk 33. Accordingly, flutter can be avoided because coupling between the vibrations of the blades and the vibration of the disk 33 is less likely to occur.

(14) A turbine T according to a fourteenth aspect includes:
a shaft 40 configured to rotate about a rotor axis Ac;
a pair of rotating blade rows 30, the pair of rotating blade rows 30 including a pair of disks 33 that extend radially outward from the shaft 40 and are disposed at an interval in a direction of the rotor axis Ac, each one of the pair of rotating blade rows 30 including a plurality of rotating blades 31 arranged in a circumferential direction on an outer peripheral end of the disk 33; and
a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction, wherein
a rotating blade 31 of the plurality of rotating blades 31 continuous in the circumferential direction is provided with a concave portion H of the rotating blade, the concave portion H being recessed radially inward from a radially outer end surface.

According to the above-described configuration, the concave portion H of the rotating blade is formed in one of the plurality of rotating blades 31 continuous in the circumferential direction. In this manner, the natural frequency can be different between adjacent rotating blades 31. As a result, the possibility of flutter occurring in the rotating blades 31 can be reduced, and the weight of the rotating blades 31 can be reduced.

(15) In the turbine T according to a fifteenth aspect,
the concave portion H of the rotating blade gradually decreases in opening area toward a radially inner side.

According to the above-described configuration, the opening area of the concave portion H of the rotating blade gradually decreases toward the inner side in the radial direction. As a result, the thickness of the rotating blade 31 can be ensured on the inner side in the radial direction where strength is required, and further weight reduction of the rotating blade 31 can be achieved by increasing the opening area on the outer side in the radial direction where there is a low strength load.

(16) A turbine T according to a sixteenth aspect includes:
a shaft 40 configured to rotate about a rotor axis Ac;
a pair of rotating blade rows 30, the pair of rotating blade rows 30 including a pair of disks 33 that extend radially outward from the shaft 40 and are disposed at an interval in a direction of the rotor axis Ac, each one of the pair of rotating blade rows 30 including a plurality of rotating blades 31 arranged in a circumferential direction on an outer peripheral end of the disk 33;
a pair of stator vane rows 20 disposed in a one-to-one manner on a first side of the pair of rotating blade rows 30 in the direction of the rotor axis Ac, each one of the pair of stator vane rows 20 including a plurality of stator vanes 21 arranged in the circumferential direction;

an annular portion Dc provided on the disk 33, the annular portion Dc having an annular shape centered on the rotor axis Ac;

a plurality of linear portions DL extending in the direction of the rotor axis Ac arranged at intervals in the circumferential direction along the annular portion Dc; and a damper portion D formed of a different material than the disk 33.

According to the above-described configuration, when vibration occurs in the disk 33, the damper portion D including the annular portion Dc and the linear portions DL slides against the disk 33, thereby exerting a vibration damping force. This can effectively reduce the vibration of the disk 33 and the rotating blades 31.

(18) The turbine T according to an eighteenth aspect, wherein the plurality of linear portions DL are each formed by a piezoelectric element.

Adding an LC circuit gives the piezoelectric element a characteristic where, when deformation is caused by an external force, the electromotive force of the LC circuit causes hardness to increase. By configuring the linear portions DL as passive piezoelectric elements, when vibration occurs, the hardness of the elements increases and vibration can be more effectively dampened. A power supply circuit may be added instead of an LC circuit to form an active piezoelectric element.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A turbine, comprising:
a shaft configured to rotate about a rotor axis;
a pair of rotating blade rows, each one of the pair of rotating blade rows including a disk that extends radially outward from the shaft and a plurality of rotating blades arranged in a circumferential direction on an outer peripheral end of the disk, the disks of the pair of rotating blade rows being disposed at an interval in an axial direction; and
a pair of stator vane rows arranged such that one of the pair of rotating blade rows is spaced axially between the pair of stator vane rows, each one of the pair of stator vane rows including a plurality of stator vanes arranged in the circumferential direction, wherein
a number of the rotating blades on each one of the pair of rotating blade rows is the same, and a number of the stator vanes on each one of the pair of stator vane rows is the same,
the disk of each of the pair of rotating blade rows extends from the outer peripheral end in a direction toward the disk of the other of the pair of rotating blade rows, and
an attachment is connected to an outer peripheral surface of the shaft, and radially inner end portions of the disks are connected to the attachment.

2. The turbine according to claim 1, wherein
the number of the stator vanes ranges from 30% to 70% of the number of the rotating blades.

3. The turbine according to claim 1, wherein each disk includes a plurality of concave portions arranged at intervals in the circumferential direction, formed in a surface of the disk facing the axial direction.

4. The turbine according to claim 1, wherein each disk includes a plurality of through-holes arranged at intervals in the circumferential direction, formed in a surface of the disk facing axis the axial direction.

5. The turbine according to claim 1, wherein each disk includes a plurality of convex portions arranged at intervals in the circumferential direction, formed in a surface of the disk facing the axial direction.

6. The turbine according to claim 1, wherein
for each one of the pair of rotating blade rows, a rotating blade of the plurality of rotating blades is provided with a concave portion of, the concave portion being recessed radially inward from a radially outer end surface of the rotating blade.

7. The turbine according to claim 6, wherein
the concave portion of the rotating blade gradually decreases in opening area toward a radially inner side.

8. The turbine according to claim 1, wherein each disk includes a damper portion formed of a different material than the disk, the damper portion including:
an annular portion provided on the disk, the annular portion having an annular shape centered on the rotor axis; and
a plurality of linear portions extending in the axial direction and arranged at intervals in the circumferential direction along the annular portion.

9. The turbine according to claim 8, wherein the plurality of linear portions are each formed by a piezoelectric element.

10. A turbine, comprising:
a shaft configured to rotate about a rotor axis;
a pair of rotating blade rows, each one of the pair of rotating blade rows including a disk that extends radially outward from the shaft and a plurality of rotating blades arranged in a circumferential direction on an outer peripheral end of the disk, the disks of the pair of rotating blade rows being disposed at an interval in an axial direction; and
a pair of stator vane rows arranged such that one of the pair of rotating blade rows is spaced axially between the pair of stator vane rows, each one of the pair of stator vane rows including a plurality of stator vanes arranged in the circumferential; direction, wherein
each disk includes a plurality of concave portions arranged at intervals in the circumferential direction, formed in a surface the disk facing the axial direction,
the disk of each of the pair of rotating blade rows extends from the outer peripheral end in a direction toward the disk of the other of the pair of rotating blade rows, and
an attachment is connected to an outer periperal surface of the shaft, and radially inner end portions of the disks are connected to the attachment.

11. A turbine, comprising:
a shaft configured to rotate about a rotor axis;
a pair of rotating blade rows, each one of the pair of rotating blade rows including a disk that extends radially outward from the shaft and a plurality of rotating blades arranged in a circumferential direction on an outer peripheral end of the disk, the disks of the pair of rotating blade rows being disposed at an interval in an axial direction; and
a pair of stator vane rows arranged such that one of the pair of rotating blade rows is spaced axially between the pair of stator vane rows, each one of the pair of stator vane rows including a plurality of stator vanes arranged in the circumferential direction, wherein
for each one of the pair of rotating blade rows, a rotating blade of the plurality of rotating blades is provided with a concave portion, the concave portion being recessed radially inward from a radially outer end surface of the rotating blade, the disk of each of the pair of rotating blade rows extends from the outer peripheral end in a direction toward the disk of the other of the pair of rotating blade rows, and an attachment is connected to an outer periperal surface of the shaft, and radially inner end portions of the disks are connected to the attachment.

12. The turbine according to claim 11, wherein
the concave portion of the rotating blade gradually decreases in opening area toward a radially inner side.

* * * * *